US009043029B2

(12) United States Patent
Seo

(10) Patent No.: US 9,043,029 B2
(45) Date of Patent: May 26, 2015

(54) WALKING ROBOT AND METHOD FOR CONTROLLING POSTURE THEREOF

(75) Inventor: Kee Hong Seo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 614 days.

(21) Appl. No.: 13/293,455

(22) Filed: Nov. 10, 2011

(65) Prior Publication Data
US 2012/0143376 A1 Jun. 7, 2012

(30) Foreign Application Priority Data

Dec. 2, 2010 (KR) ........................ 10-2010-0122157

(51) Int. Cl.
G05B 15/00 (2006.01)
B25J 9/10 (2006.01)
B62D 57/032 (2006.01)

(52) U.S. Cl.
CPC ............... B25J 9/104 (2013.01); B62D 57/032 (2013.01)

(58) Field of Classification Search
USPC ......... 700/245, 247, 249, 250, 252, 253, 260, 700/261, 263
See application file for complete search history.

(56) References Cited

U.S. PATENT DOCUMENTS

| | | | | |
|---|---|---|---|---|
| 5,337,235 A | * | 8/1994 | Takahashi et al. | 701/23 |
| 5,459,659 A | * | 10/1995 | Takenaka | 700/260 |
| 5,739,655 A | * | 4/1998 | Torii et al. | 318/568.12 |
| 7,664,569 B2 | * | 2/2010 | Shimizu et al. | 700/245 |
| 7,908,032 B2 | * | 3/2011 | Morimoto et al. | 700/245 |
| 8,195,332 B2 | * | 6/2012 | Pratt et al. | 700/258 |
| 8,447,429 B2 | * | 5/2013 | Chang et al. | 700/254 |
| 2004/0116836 A1 | * | 6/2004 | Kawai et al. | 600/595 |
| 2004/0176875 A1 | * | 9/2004 | Iribe et al. | 700/245 |
| 2005/0038560 A1 | * | 2/2005 | Nagasaka | 700/245 |
| 2005/0102111 A1 | * | 5/2005 | Dariush et al. | 702/41 |
| 2005/0165507 A1 | * | 7/2005 | Shimizu et al. | 700/245 |
| 2005/0234593 A1 | * | 10/2005 | Goswami et al. | 700/245 |
| 2007/0016329 A1 | * | 1/2007 | Herr et al. | 700/250 |
| 2007/0156283 A1 | * | 7/2007 | Takenaka | 700/245 |
| 2008/0258669 A1 | * | 10/2008 | Fukuda et al. | 318/568.12 |
| 2008/0281469 A1 | * | 11/2008 | Choi et al. | 700/253 |
| 2009/0135187 A1 | * | 5/2009 | Lee et al. | 345/473 |
| 2010/0070076 A1 | * | 3/2010 | Zaier | 700/245 |
| 2010/0161116 A1 | * | 6/2010 | Kwak et al. | 700/245 |
| 2010/0185330 A1 | * | 7/2010 | Kwon | 700/261 |
| 2010/0250001 A1 | * | 9/2010 | Hodgins et al. | 700/261 |

(Continued)

OTHER PUBLICATIONS

Zheng et al., Gait synthesis for the SD-2 biped robot to climb sloping surface, Feb. 1990, IEEE.*

Primary Examiner — Thomas G Black
Assistant Examiner — Sara Nelson
(74) Attorney, Agent, or Firm — Harness, Dickey & Pierce, P.L.C.

(57) ABSTRACT

A walking robot having joints which move using a torque servo, a posture of the robot being stably controlled, and a method of controlling a posture of the robot. It is possible to maintain a stable angle of the upper body while keeping an erect posture and balance using the COG of the robot and the inclination and the direction of the upper body and the pelvis of the robot, even in an external variation including external force or an inclination angle of the ground. Even in a state in which terrain information is not known in advance, the robot may keep an erect posture in a direction of gravity. Even when a plane where the robot stands is gradually inclined, the postures of the upper body and the legs of the robot may be kept while actively changing the angle of the ankle joint.

21 Claims, 6 Drawing Sheets

(56) References Cited

U.S. PATENT DOCUMENTS

| | | | |
|---|---|---|---|
| 2010/0324699 A1* | 12/2010 | Herr et al. | 623/27 |
| 2011/0066283 A1* | 3/2011 | Hammam et al. | 700/250 |
| 2011/0098857 A1* | 4/2011 | Yoshiike et al. | 700/246 |
| 2011/0196532 A1* | 8/2011 | Chang et al. | 700/254 |
| 2011/0231050 A1* | 9/2011 | Goulding | 701/26 |
| 2012/0158174 A1* | 6/2012 | Moon et al. | 700/245 |
| 2013/0184861 A1* | 7/2013 | Pratt et al. | 700/245 |
| 2013/0238183 A1* | 9/2013 | Goulding | 701/26 |

* cited by examiner

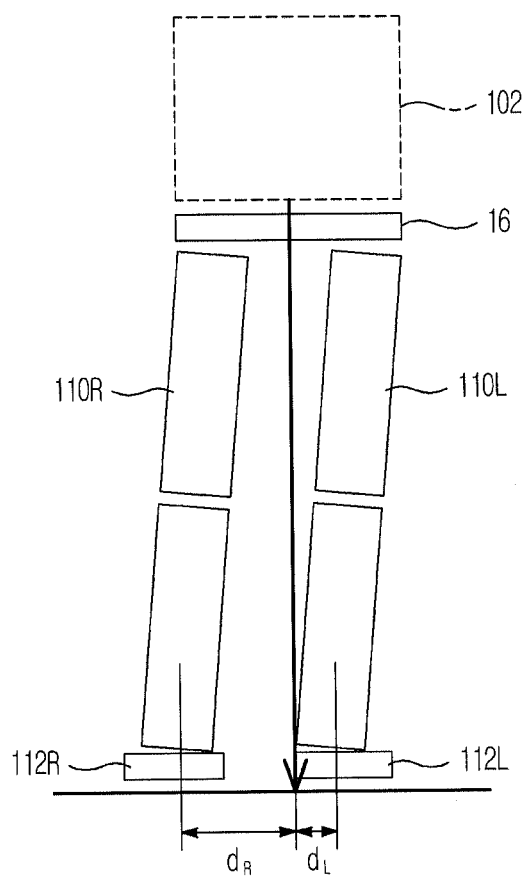

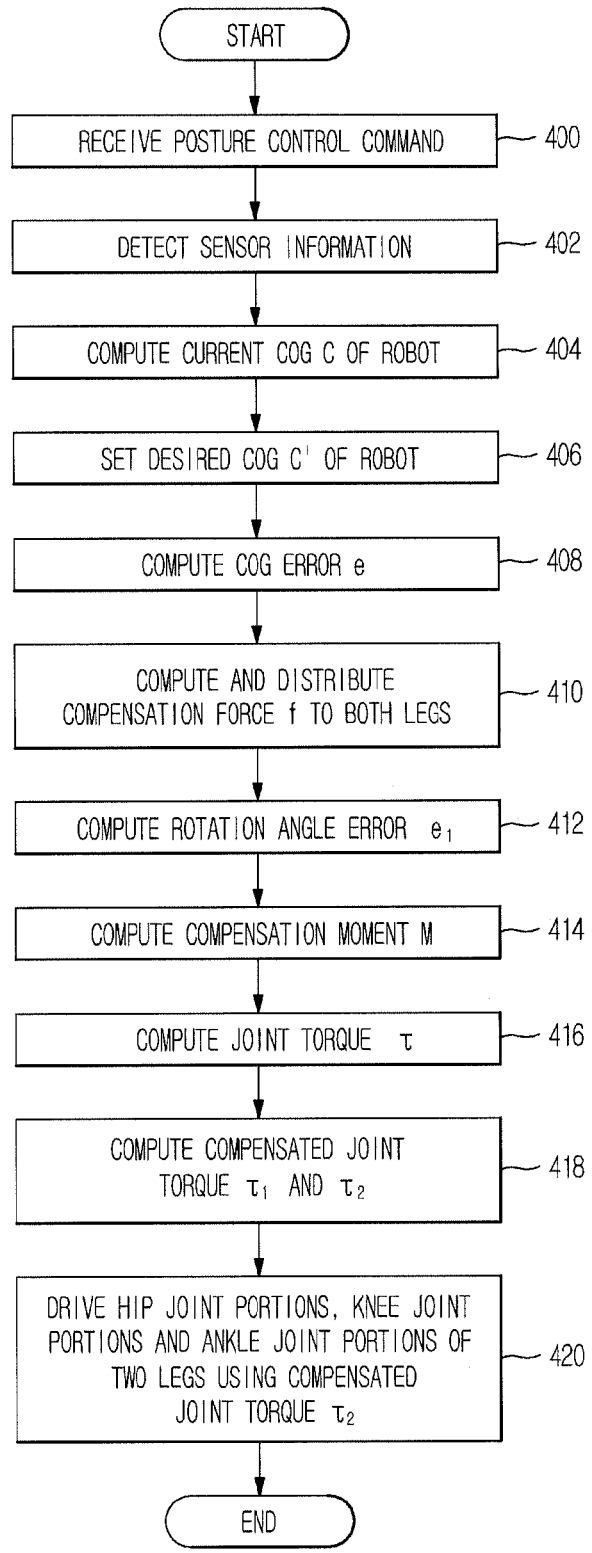

WALKING ROBOT AND METHOD FOR CONTROLLING POSTURE THEREOF

CROSS-REFERENCE TO RELATED APPLICATIONS

This application claims the benefit of Korean Patent Application No. 2010-122157, filed on Dec. 2, 2010 in the Korean Intellectual Property Office, the disclosure of which is incorporated herein by reference.

BACKGROUND

1. Field

Embodiments relate to a walking robot having joints which move using a torque servo, a posture of the robot being stably controlled, and a method of controlling a posture of the robot.

2. Description of the Related Art

In general, research into a walking robot which has a joint structure similar to that of a human and coexists with the humans in a working and living space has been actively conducted. The walking robot includes a multilegged walking robot having multiple legs such as two legs or three legs. For stable walking, an actuator such as an electric motor or a hydraulic motor mounted in each joint is driven. Examples of a method of driving an actuator include a position-based Zero Moment Point (ZMP) control method of providing a command angle, that is, a command position, of each joint and controlling each joint to move according to the command angle, and a Finite State Machine (FSM) control method of providing command torque of each joint and controlling each joint to move according to the command torque.

In the ZMP control method, a walking direction, a stride width, a walking rate and the like are determined in advance so as to satisfy a ZMP constraint, that is, a condition in which a ZMP is present in a safe area (which corresponds to the area of one foot in the case where the robot is supported by one foot or corresponds to a small area which is set in consideration of safety in a convex polygon including the areas of two feet in the case where the robot is supported by two feet) of a stance polygon formed by stances of legs of the robot, the walking pattern of each leg corresponding to the determination is generated, and the walking trajectory of each leg is calculated according to the walking pattern. The angle of the joint of each leg is calculated by inverse Kinematic calculation of the calculated walking trajectory and a desired control value of each joint is calculated based on the current angle and the desired angle of each joint. Servo control is performed such that each leg moves along the calculated walking trajectory during every control time period. That is, determination as to whether the position of each leg accurately moves along the walking trajectory according to the walking pattern is made. If each leg deviates from the walking trajectory, the torque of the motor is adjusted such that each leg accurately moves along the walking trajectory.

Since the ZMP control method is a position-based control method, accurate position control is possible. However, since accurate angle control of each joint is performed in order to control the ZMP, high servo gain is necessary. Therefore, since high current is necessary, energy efficiency is low and joint rigidity is high, thereby giving surroundings a big shock. Since Kinematic Singularity is avoided in order to calculate the angle of each joint, the robot always bends its knees while walking. Thus, the robot may unnaturally walk unlike a human.

SUMMARY

Therefore, it is an aspect of an embodiment to provide a walking robot which maintains a stable upper body angle so as to keep an erect posture and balance even when external force is applied or an inclination angle of the ground varies, and a method of controlling a posture thereof.

Additional aspects of embodiments will be set forth in part in the description which follows and, in part, will be obvious from the description, or may be learned by practice of the embodiments.

In accordance with an aspect of the an embodiment, there is provided a method for controlling a posture of a robot including an upper body, a pelvis link connected to a lower side of the upper body, a plurality of hip joint portions connected to a lower side of the pelvis link, a plurality of legs respectively connected to the plurality of hip joint portions, and feet respectively provided in the plurality of legs, the method including: computing a position of a current Center of Gravity (COG) of the robot; setting a position of a desired COG of the robot; computing an error between the set position of the desired COG and the computed position of the current COG; computing force to be compensated for keeping balance of the robot using the computed COG error; distributing the computed compensation force and computing joint torque to control a posture of each of the legs; and performing torque servo control using the computed joint torque.

The position of the desired COG may be set to a position separated from a middle portion between the plurality of feet which touch the ground in a vertical direction.

The position of the desired COG may be set to a position separated from a certain point of the plurality of feet which touch the ground in a vertical direction.

The distributing of the computed compensation force to the plurality of legs may include computing distances between a point of the COG of the robot projected on the ground and the plurality of feet; and enabling a leg closer to the point of the COG of the robot projected on the ground to have a larger value, based on the computed distances.

The method may further include measuring an actual rotation angle of the pelvis link; computing an error between the measured actual rotation angle and a desired rotation angle; and computing moment to be compensated to keep the robot balanced using the computed rotation angle error, and the computing of the joint torque may include computing the joint torque to generate the computed compensation moment and the computed compensation force.

The measuring of the actual rotation angle of the pelvis link may include measuring the rotation angle in a yaw direction (Z-axis rotation), a pitch direction (Y-axis rotation) and a roll direction (X-axis direction) with respect to inclination of a torso using an inertial measurement unit (IMU).

The method may further include computing gravity compensation torque of each of the legs, and the computing of the joint torque may include compensating for the joint torque of each of the legs using the gravity compensation torque.

The gravity compensation torque may be computed using angles q of all joints of the feet, masses and COG positions of all links belonging to the legs and the total mass and the COG position of the upper body.

The computing of the gravity compensation torque of each of the legs may include performing gravity compensation in consideration of the weight of the upper body according to the force distributed to the plurality of legs.

The computing of the gravity compensation torque of each of the legs may include performing gravity compensation in consideration of the weight of the other leg according to the states of the plurality of legs.

The states of the plurality of legs may be divided into an upper body supporting state or a swing state depending on whether or not the feet respectively provided to the plurality of legs touch the ground.

The method may further include computing damping torque of each of the legs, and the computing of the joint torque may compensate for the computed joint torque of each of the legs using the damping torque.

In accordance with another aspect of an embodiment, there is provided a walking robot including an upper body, a pelvis link connected to a lower side of the upper body, a plurality of hip joint portions connected to a lower side of the pelvis link, a plurality of legs respectively connected to the plurality of hip joint portions, and feet respectively provided to the plurality of legs, the walking robot including: a computation unit to calculate a position of a current Center of Gravity (COG) of the robot; a setting unit to set a position of a desired COG of the robot; a posture control unit to compute an error between the set position of the desired COG and the computed position of the current COG, to compute force to be compensated to keep the robot balanced using the computed COG error, to distribute the computed compensation force and compute joint torque to control a posture of each of the legs; and a servo control unit to perform torque servo control using the computed joint torque.

The posture control unit may compute distances between a point of the COG of the robot projected on the ground and the plurality of feet, and distribute the computed compensation force to the plurality of legs so as to enable a leg closer to the point of the COG of the robot projected on the ground to have a larger value based on the computed distances.

The walking robot may further include an inertial measurement unit (IMU) to measure an actual rotation angle of the pelvis link, and the posture control unit may compute an error between the measured actual rotation angle and a desired rotation angle and compute moment to be compensated to keep the robot balanced using the computed rotation angle error.

The posture control unit may compute the joint torque to generate the computed compensation moment and the computed compensation force and control the posture of each of the plurality of legs.

The posture control unit may measure the rotation angle in a yaw direction (Z-axis rotation), a pitch direction (Y-axis rotation) and a roll direction (X-axis direction) with respect to inclination of a torso using an inertial measurement unit (IMU).

The posture control unit may compute gravity compensation torque of each of the legs and compensate for the joint torque of each of the legs using the gravity compensation torque.

The posture control unit may compute damping torque of each of the legs and compensate for the joint torque of each of the legs using the computed damping torque.

BRIEF DESCRIPTION OF THE DRAWINGS

These and/or other aspects of embodiments will become apparent and more readily appreciated from the following description of the embodiments, taken in conjunction with the accompanying drawings of which:

FIG. 5 is a front view showing a link configuration of the robot according to an embodiment; and FIG. 6 is a flowchart illustrating a method of controlling a posture of the robot according to an embodiment.

DETAILED DESCRIPTION

Reference will now be made in detail to embodiments, examples of which are illustrated in the accompanying drawings.

Figure 1:
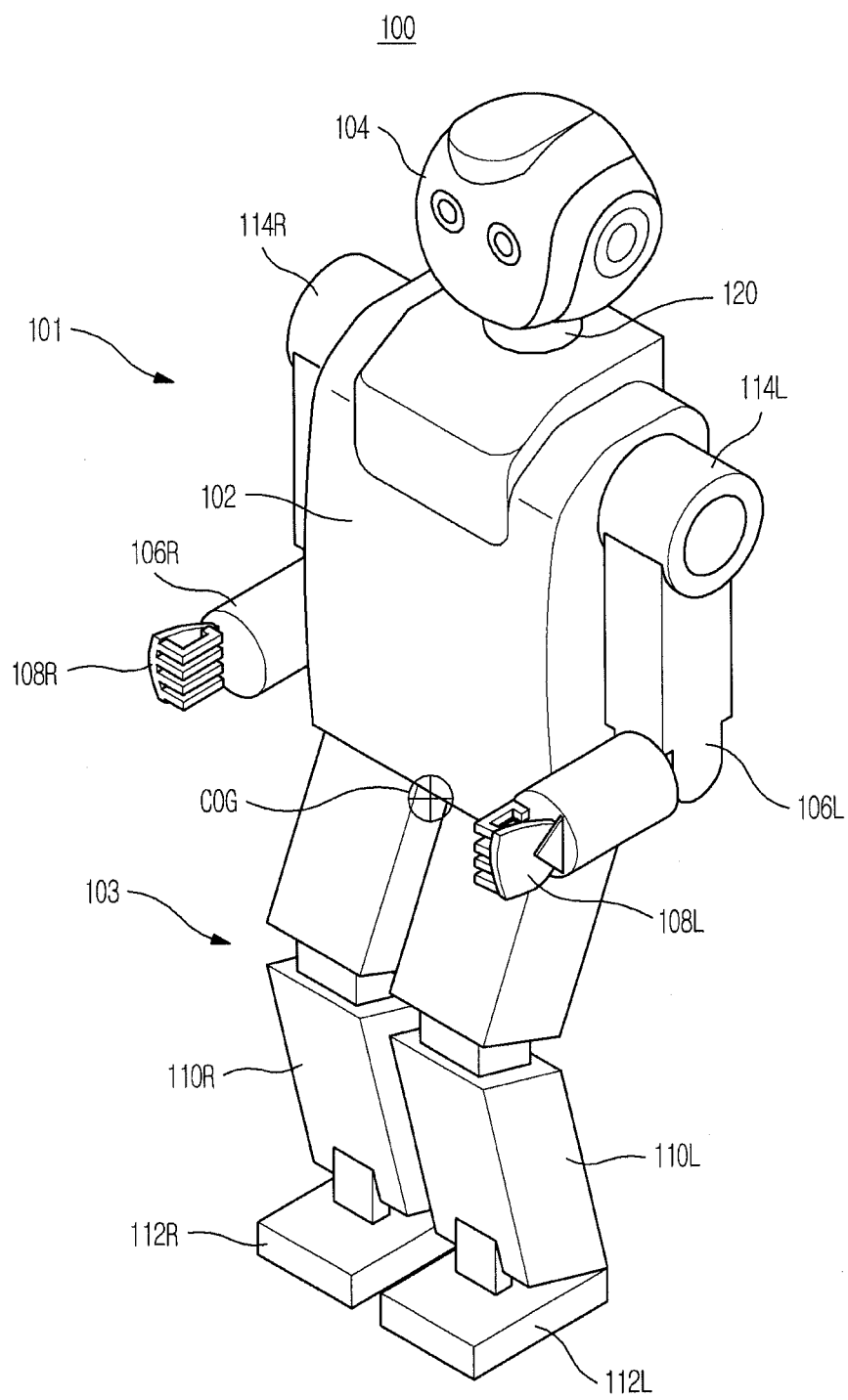
FIG. 1 is a diagram showing the appearance of a robot according to an embodiment.
Figure 2:
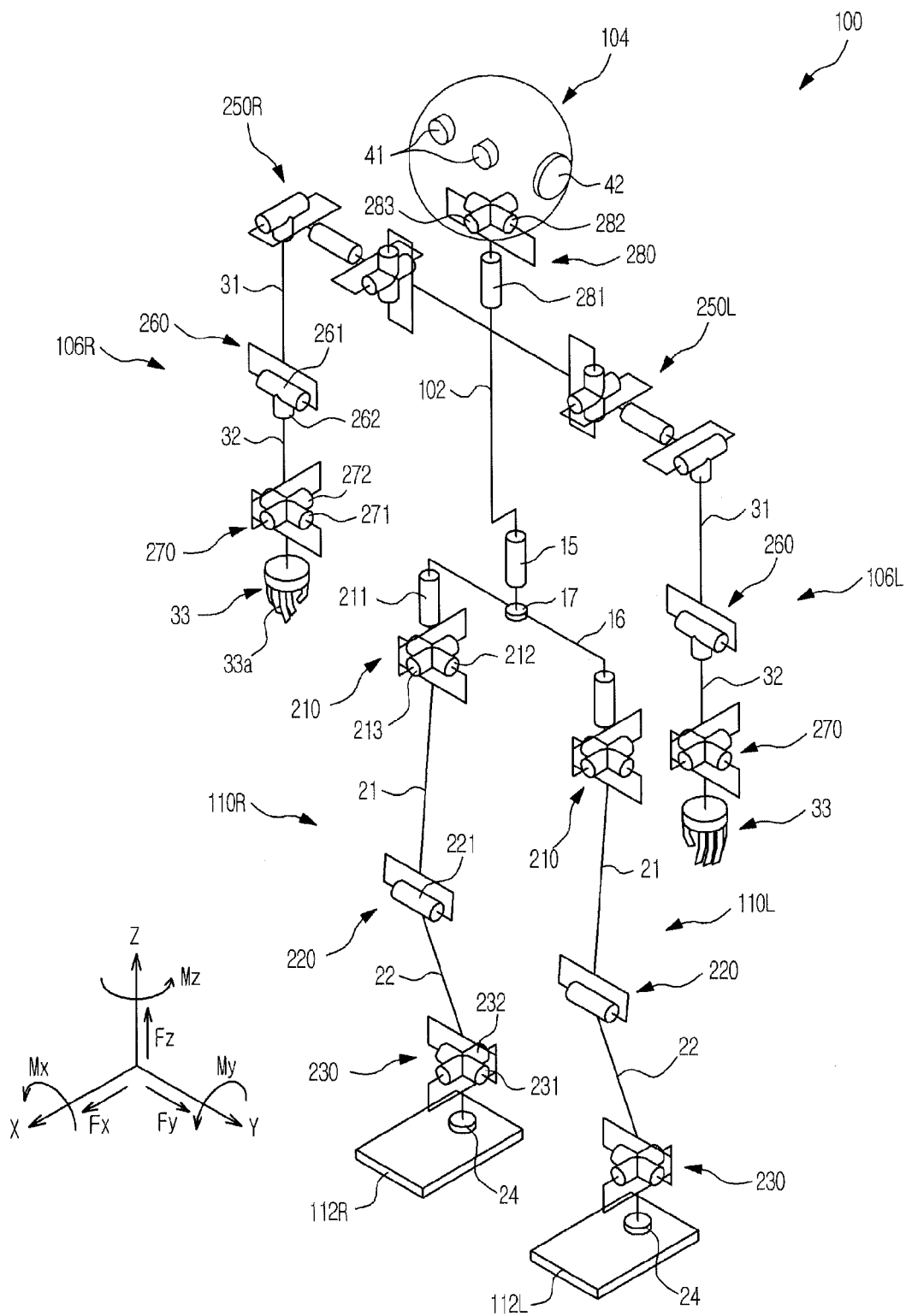
FIG. 2 is a diagram showing the structures of main joints of the robot shown in FIG. 1.

FIG. 1 is a diagram showing the appearance of a robot according to an embodiment, and FIG. 2 is a diagram showing the structures of main joints of the robot shown in FIG. 1.

In FIGS. 1 and 2, the robot 100 is a bipedal robot which walks erect using two legs 110 similar to a human, and includes an upper body 101 including a torso 102, a head 104 and arms 16, and a lower body 103 including two legs 110.

The upper body 101 of the robot 100 includes the torso 102, the head 104 connected to the upper portion of the torso 102 via a neck 120, two arms 106L and 106R connected to both sides of the upper portion of the torso 102 via shoulders 114L and 114R, and hands 108L and 108R respectively connected to ends of the two arms 106L and 106R.

A waist joint portion 15 with one degree of freedom in a yaw direction is provided in the torso 102 of the robot 100 such that the upper body 101 may be rotated.

The lower body 103 of the robot 100 includes a pelvis link 16 connected to a lower side of the waist joint portion 15, the two legs 110L and 110R connected to both sides of a lower portion of the pelvis link 16 and feet 112L and 112R connected to ends of the two legs 110L and 110R.

In the reference numerals, R and L denote the right and the left of the robot 100, respectively, and Center of Gravity (COG) denotes Center of gravity of the robot 100.

A camera 41 to photograph surroundings and a microphone 42 to receive user voice are provided in the head 104 of the robot 100.

The head 104 is connected to the torso 102 of the upper body 101 via a neck joint portion 280. The neck joint portion 280 has 3 degrees of freedom including a yaw-direction (Z-axis) rotation joint 281, a pitch-direction (Y-axis) rotation joint 282 and a roll-direction (X-axis) rotation joint 283.

Motors (e.g., actuators such as an electrical motor and a hydraulic motor) to rotate the head 104 are connected to the rotation joints 281, 282 and 283 of the neck joint portion 280.

Each of the two arms 106L and 106R of the robot 100 has an upper link 31, a lower link 32 and a hand 33.

The upper link 31 is connected to the upper body 101 via each of shoulder joint portions 250L and 250R, the upper link 31 and the lower line 32 are connected to each other via an elbow joint portion 260, and the lower link 32 and the hand 33 are connected to each other via a wrist joint portion 270.

The shoulder joint portions 250L and 250R are mounted at both sides of the torso 102 of the upper body 101 so as to connect two arms 106L and 106R to the torso 102 of the upper body 101.

The elbow joint portion 260 has two degrees of freedom including a pitch-direction rotation joint 261 and a yaw-direction rotation joint 262.

The wrist joint portion 270 has two degrees of freedom including a pitch-direction rotation joint 271 and a roll-direction rotation joint 272.

Five fingers 33a are mounted in the hand 33. A plurality of joints (not shown) driven by the motors may be mounted in each of the fingers 33a. The fingers 33a perform various operations such as grasping an object or indication of a specific direction in interlock with the motion of the arm 106.

The pelvis link 16 having two hip joint portions 210 is connected to a lower side of the torso 102. The pelvis link 16 corresponds to the pelvis of a human and is connected to the torso 102 of the upper body 101 via the hip joint portions 210. An inertial measurement unit (IMU) 17 is provided in the pelvis link 16. The IMU 17 detects an angle of the pelvis link 16 relative to the direction of gravity and an inertial frame and posture information of a roll direction (X-axis rotation), a pitch direction (Y-axis rotation) and a yaw direction (Z-axis rotation).

Each of the two legs 110L and 110R of the robot 100 has a thigh link 21, a shin link 22 and a foot 112L or 112R.

The thigh link 21 corresponds to the thigh of a human and is connected to the pelvis link 16 via the hip joint portion 210. The thigh link 21 and the shin link 22 are connected to each other via a knee joint portion 220, and the shin link 22 and the foot 112L or 112R are connected to each other via an ankle joint portion 230.

The hip joint portion 210 has 3 degrees of freedom including a yaw-direction (Z-axis) rotation joint 211, a pitch-direction (Y-axis) rotation joint 212 and a roll-direction (X-axis) rotation joint 213.

The knee joint portion 220 has one degree of freedom including a pitch-direction rotation joint 221.

The ankle joint portion 230 has two degrees of freedom including a pitch-direction rotation joint 231 and a roll-direction rotation joint 232.

Since six rotation joints are provided in each of the two legs 110L and 110R with respect to the hip joint portion 210, the knee joint portion 220 and the ankle joint portion 230, 12 rotation joints in total are provided to the two legs 110L and 110R.

Meanwhile, in each of the two legs 110L and 11R, a multi-axis Force and Torque (F/T) sensor 24 is mounted between the foot 112L or 112R and the ankle joint portion 230. The F/T sensor 24 measures three directional components Fx, Fy and Fz of force transferred from the foot 112L or 112R and three directional components Mx, My and Mz of moment so as to detect landing of the foot 112L or 112R and load applied to the foot 112L or 112R.

Although not shown in the drawings, actuators such as motors to drive the rotation joints are provided in the robot 100. A posture control unit to control the overall operation of the robot 100 adequately controls the motors so as to perform various operations of the robot 100.

The robot 100 computes a torque command of each joint in correspondence with each control action, outputs the computed torque command to the actuator such as the motor provided in each joint, and drives the actuator, in order to execute the control action.

In an embodiment, force and moment to be adjusted in real time to keep the robot 100 balance in real time are computed using an angle between a position of a COG of the robot 100 and an inertial frame of the pelvis link 16. The computed compensation force and moment are distributed to two legs 110L and 110R so as to compute joint torque to control the postures of the legs 110L and 110R and torque servo control of the two legs 110L and 110R is performed using the computed joint torque. Thus, since the angle of the upper body 101 is stably maintained using the joint torque, it is possible to keep the robot 100 erect and balanced. A portion to compensate for torque due to gravity of each leg 110L or 110R is added such that the COG of the robot is moved to a lower side due to gravity. Since the inclination of the robot 100 relative to the direction of gravity is obtained by the IMU 17, even when the ground is inclined in a certain direction, the postures of the upper body 101 and the legs 110L and 110R are kept while actively controlling the torque of the ankle joint portion 230. This will be described in detail with reference to FIG. 3.

Figure 3:
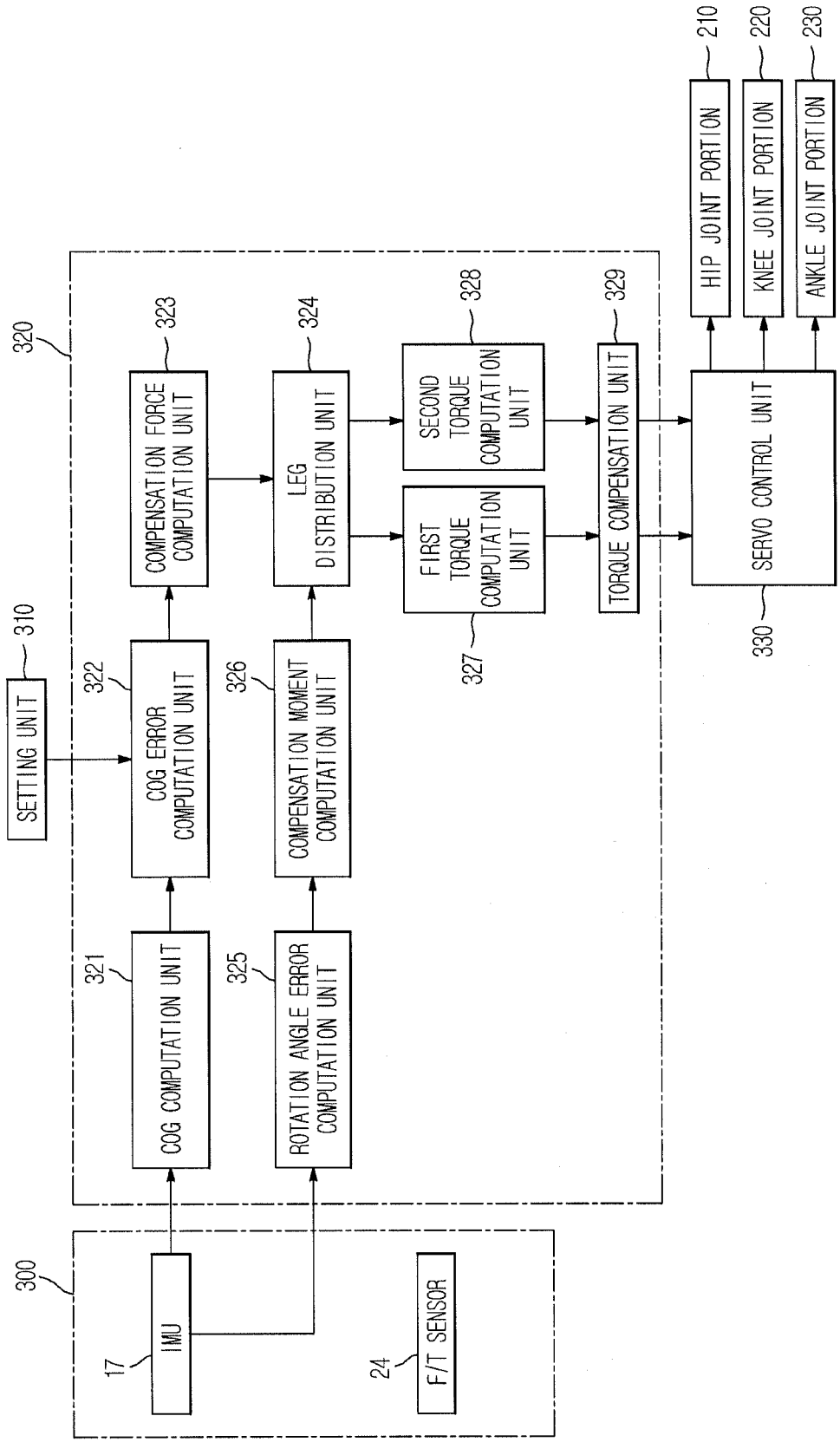
FIG. 3 is a block diagram showing the configuration of a posture control system of the robot according to an embodiment.
Figure 4:
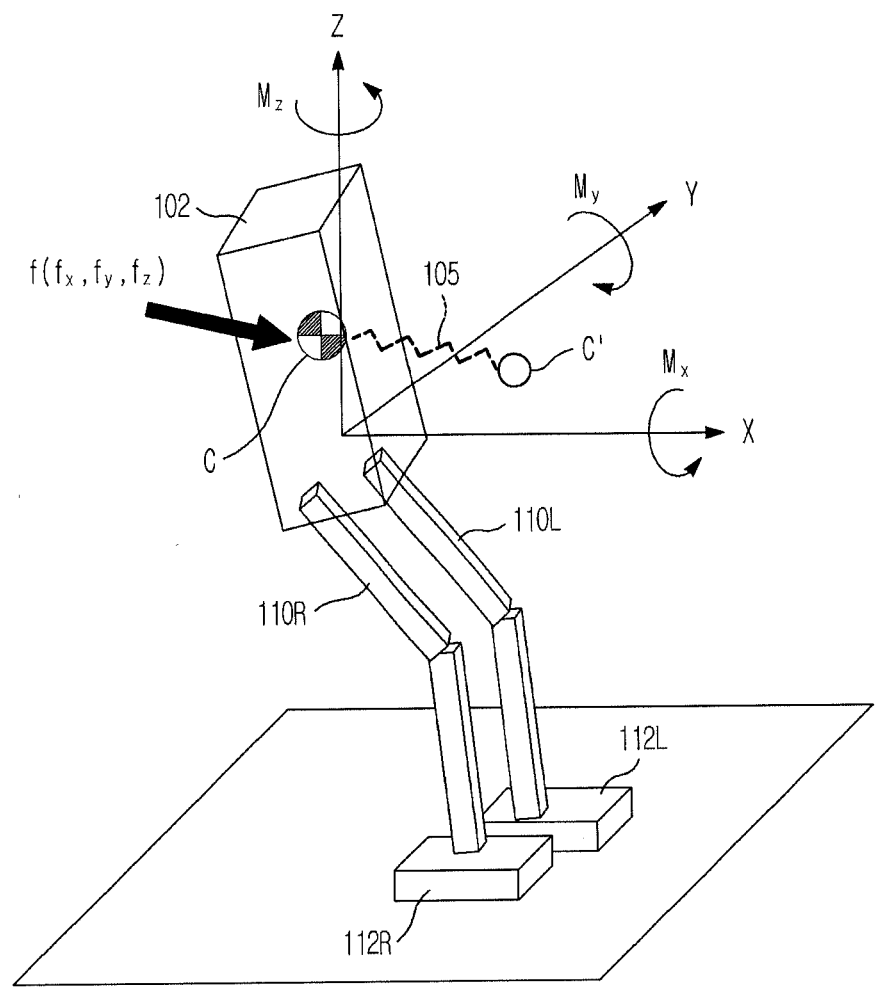
FIG. 4 is a perspective view showing a link configuration of the robot according to an embodiment.

FIG. 3 is a block diagram showing the configuration of a posture control system of the robot according to an embodiment, FIG. 4 is a perspective view showing a link configuration of the robot according to an embodiment, and FIG. 5 is a front view showing a link configuration of the robot according to an embodiment.

In FIG. 3, the posture control system of the robot 100 according to an embodiment includes a sensor unit 300, a setting unit 310, a posture control unit 320, a servo control unit 330, and the hip joint portions 210, the knee joint portions 220 and the ankle joint portions 230 of the feet 110L and 110R.

The sensor unit 300 includes the IMU 17 to measure the slope and the rotation angle of the pelvis link 16 in the roll direction (X-axis rotation), the pitch direction (Y-axis direction) and the yaw direction (Z-axis direction) and the F/T sensor 24 provided between the foot 112 and the ankle joint portion 230 of the robot 100 to detect whether or not the foot 112 touches the ground.

As the sensor to detect the posture of the upper body 101, a tilt detector, a gyro sensor, etc. may be used in addition to the IMU 17. As the sensor to detect whether or not the foot 112 touches the ground, a touch sensor or another sensor similar thereto may be used in addition to the F/T sensor 24.

The setting unit 310 sets a position of a desired COG C'(x, y, z) of the robot 100 to a position separated from a middle point between the feet 112L and 112R of the robot 100, which touch the ground, in a vertical direction, such that the robot 100 keeps balance in real time while maintaining an erect posture. As shown in FIG. 5, in order to keep the robot 100 balanced, the position of the desired COG C'(x, y, z) suitable for the state of the robot 100 is set.

The posture control unit 320 is a Proportional-Derivative (PD) or Proportional-Integral-Derivative (PID) controller to control the posture of the robot 100 based on the desired COG of the robot 100 set by the setting unit 310 and sensor information detected by the sensor unit 300 and includes a COG computation unit 321, a COG error computation unit 322, a compensation force computation unit 323, a leg distribution unit 324, a rotation angle error computation unit 325, a compensation moment computation unit 326, first and second torque computation units 327 and 328, and a torque compensation unit 329.

The COG computation unit 321 computes the position of the current COG C(x, y, z) of the robot 100 using the IMU 17 and forward kinematics. The position of the current COG C(x, y, z) is within the torso 102 as shown in FIG. 4. At this time, the direction of the current COG C(x, y, z) follows the orientation of the inertial frame fixed to the direction of gravity.

The COG error computation unit 322 computes an error e between the computed position of the current COG C(x, y, z) and the set position of desired COG C'(x, y, z) as expressed by Equation 1.

$$e = C' - C \qquad \text{Equation 1}$$

The compensation force computation unit 323 computes force $f(f_x, f_y, f_z)$ to be adjusted to keep the robot 100 balance using the COG error e computed by the COG error computation unit 322 as expressed by Equation 2 when a virtual spring 105 (constant; $k_p$) is present between the computed position of the current COG C(x, y, z) and the set position of the desired COG C'(x, y, z).

$$f = k_p e \qquad \text{Equation 2}$$

The leg distribution unit 324 distributes the compensation force $f(f_x, f_y, f_z)$ computed using the COG error e to the two legs 110L and 110R as expressed by Equation 3.

$$f_{Left} = w_L k_p e$$

$$f_{Right} = w_R k_p e \qquad \text{Equation 3}$$

In Equation 3, when distances $d_L$ and $d_R$ between a point of the COG of the robot 100 projected on the ground and the feet 112L and 112R are set as shown in FIG. 5, for example, a value $w_L$ of the leg 110L closer to a point of the COG of the robot 100 projected on the ground has a value greater than the value $w_R$ of the leg 110R as expressed by Equation 4.

$$w_L = \frac{d_R}{d_R + d_L} \qquad \text{Equation 4}$$

$$w_R = 1 - w_L$$

The rotation angle error computation unit 325 computes an error $e_1$ between a desired rotation angle and the rotation angle of the pelvis link 16 in the roll direction (X-axis rotation), the pitch direction (Y-axis rotation) and the yaw direction (Z-axis rotation) measured by the IMU 17.

The compensation moment computation unit 326 computes moment $M(M_x, M_y, M_z)$ to be compensated for keeping balance of the robot 100 using the rotation angle error $e_1$ computed by the rotation angle error computation unit 324 as expressed by Equation 5 if it is assumed that a virtual spring (constant $k_1$) is present in three axes including the roll direction α-axis rotation), the pitch direction (Y-axis rotation) and the yaw direction (Z-axis rotation) of the pelvis link 16.

$$M = k_1 e_1 \qquad \text{Equation 5}$$

The first and second torque computation units 327 and 328 compute joint torque τ to generate the compensation moment M computed by the compensation moment computation unit 326 and the compensation force f computed by the compensation force computation unit 323 as expressed by Equation 6.

$$\tau_{Left} = J^T \begin{bmatrix} f_{Left} \\ M \end{bmatrix}$$

$$\tau_{Right} = J^T \begin{bmatrix} f_{Right} \\ M \end{bmatrix} \qquad \text{Equation 6}$$

In Equation 6, joint torque τ is a 6-vector.

The torque compensation unit 329 computes a compensated joint torque $\tau_1$ by adding torque G(q) for gravity compensation to the joint torque τ obtained by Equation 6 as expressed by Equation 7. At this time, since the torque $\tau_{Left}$ of the left leg 110L and the torque $\tau_{Right}$ of the right leg 110R are subjected to the same processing, they are denoted by τ.

$$\tau_1 = \tau + G(q) \qquad \text{Equation 7}$$

In Equation 7, G(q) may be computed using the angles q of all the joints of the feet, the masses and the COG positions of all the links 21 and 22 belonging to the legs 110R and 110L and the total mass and the COG position of the upper body 101.

In addition, the torque compensation unit 329 computes compensated joint torque $\tau_2$ by applying damping torque dw to each joint as expressed by Equation 8, in order to realize stability by system passivity.

$$\tau_2 = \tau_1 + dw \qquad \text{Equation 8}$$

In Equation 8, d denotes an appropriate damping coefficient and w denotes a measured angular velocity of a joint.

The servo control unit 330 provides the joint torque $\tau_2$ finally compensated by the torque compensation unit 329 to the hip joint portion 210, the knee joint portion 220 and the ankle joint portion 230 of the leg 110L or 110R and outputs a torque control signal corresponding to the joint torque $\tau_2$ compensated for driving actuators such as motors provided in the hip joint portion 210, the knee joint portion 220 and the ankle joint portion 230 to the hip joint portion 210, the knee joint portion 220 and the ankle joint portion 230.

Accordingly, the hip joint portion 210, the knee joint portion 220 and the ankle joint portion 230 receive the torque control signal from the servo control unit 330 and drive the actuators such as the motors provided in the hip joint portion 210, the knee joint portion 220 and the ankle joint portion 230, such that the robot 100 keeps balance in real time while maintaining an erect posture even over uneven terrain.

Hereinafter, the operation and effects of the robot having the above configuration and the posture control method thereof will be described.

FIG. 6 is a flowchart illustrating the method of controlling the posture of the robot according to an embodiment.

In FIG. 6, a user command to instruct posture control of the robot 100 is input through a user interface (400).

If the posture control command is input, the IMU 17 provided in the pelvis link 16 of the robot 100 measures the slope and the direction of the upper body 101 including the pelvis and the torso 102 using the rotation angle of the inertial frame in the roll direction (X-axis rotation), the pitch direction (Y-axis rotation) and the yaw direction (Z-axis rotation) and transmits the slope and the direction of the upper body to the COG computation unit 321 of the posture control unit 320 (402).

Accordingly, the COG computation unit 321 computes the position of the current COG C(x, y, z) of the robot 100 using the IMU 17 and forward kinematics and transmits the position of the current COG C(x, y, z) of the robot 100 to the COG error computation unit 322 (404).

The setting unit 310 sets the position of the desired COG C'(x, y, z) of the robot 100 to the position separated from the middle point between the feet 112L and 112R, which touch the ground, in the vertical direction and the transmits the position of the desired COG C'(x, y, z) of the robot to the COG error computation unit 322 (406).

The COG error computation unit 322 computes the error e between the position of the current COG C(x, y, z) computed by the COG computation unit 321 and the position of desired COG C'(x, y, z) set by the setting unit 310 as expressed by Equation 1 and transmits the error e to the compensation force computation unit 323 (408).

$$e = C' - C \qquad \text{Equation 1}$$

The compensation force computation unit 323 computes force $f(f_x, f_y, f_z)$ to be compensated to keep the robot 100 balanced using the COG error e computed by the COG error computation unit 322 as expressed by Equation 2 and transmits the force to the leg distribution unit 324.

$$f = k_p e \qquad \text{Equation 2}$$

The leg distribution unit 324 distributes the compensation force f($f_x$, $f_y$, $f_z$) computed using the COG error e to the two legs 110L and 110R as expressed by Equation 3 (410).

$$f_{Left} = w_R k_p e$$

$$f_{Right} = w_R k_p e \qquad \text{Equation 3}$$

In Equation 3, when distances $d_L$ and $d_R$ between a point of the COG of the robot 100 projected on the ground and the feet 112L and 112R are set as shown in FIG. 5, for example, a value $w_L$ of the leg 110L closer to a point of the COG of the robot 100 projected on the ground has a value greater than the value $w_R$ of the leg 110R, $$w_L = \frac{d_R}{d_R + d_L} \qquad \text{Equation 4}$$

$$w_R = 1 - w_L$$

The rotation angle error computation unit 325 computes the error $e_1$ between the desired rotation angle and the rotation angle of the pelvis link 16 in the roll direction (X-axis rotation), the pitch direction (Y-axis rotation) and the yaw direction (Z-axis rotation) measured by the IMU 17 and transmits the error $e_1$ to the compensation moment computation unit 326 (412).

The compensation moment computation unit 326 computes moment M($M_x$, $M_y$, $M_z$) to be compensated to keep the robot 100 balanced using the rotation angle error $e_1$ computed by the rotation angle error computation unit 324 as expressed by Equation 5 (414).

$$M = k_1 e_1 \qquad \text{Equation 5}$$

When the feet 112 are base links of the robot 100 and the COG is an end effector present on the pelvis link 16, a 6-by-6 Jacobian matrix J is calculated. The Jacobian matrix converts a speed of a joint space into a speed of a working space and is derived from forward Kinematics.

The first and second torque computation units 327 and 328 compute joint torque τ to generate the compensation moment M computed by the compensation moment computation unit 326 and the compensation force f computed by the compensation force computation unit 323 as expressed by Equation 6 (416)

$$\tau_{Left} = J^T \begin{bmatrix} f_{Left} \\ M \end{bmatrix} \qquad \text{Equation 6}$$

$$\tau_{Right} = J^T \begin{bmatrix} f_{Right} \\ M \end{bmatrix}$$

In Equation 6, joint torque τ is a 6-vector.

The torque compensation unit 329 computes a compensated joint torque $\tau_1$ by adding torque G(q) for gravity compensation to the joint torque τ obtained by Equation 6 as expressed by Equation 7. At this time, since the torque $\tau_{Left}$ of the left leg 110L and the torque $\tau_{Right}$ of the right leg 110R are subjected to the same processing, they are denoted by τ.

$$\tau_1 = \tau + G(q) \qquad \text{Equation 7}$$

In Equation 7, G(q) may be computed using the angles q of all the joints of the feet, the masses and the COG positions of all the links 21 and 22 belonging to the legs 110R and 110L and the total mass and the COG position of the upper body 101.

In addition, the torque compensation unit 329 computes compensated joint torque $\tau_2$ by applying damping torque dw to each joint as expressed by Equation 8, in order to realize stability by system passivity (418).

$$\tau_2 = \tau_1 + dw \qquad \text{Equation 8}$$

In Equation 8, d denotes an appropriate damping coefficient and w denotes a measured angular velocity of a joint.

The servo control unit 330 provides the joint torque $\tau_2$ finally compensated by the torque compensation unit 329 to the hip joint portion 210, the knee joint portion 220 and the ankle joint portion 230 of the leg 110L or 110R and drives actuators such as motors provided in the hip joint portion 210, the knee joint portion 220 and the ankle joint portion 230 (420). Thus, even when the ground is inclined, the robot 100 may keep balance in real time while keeping an erect posture.

Accordingly, even when the angle of the ground is not horizontal, the robot 100 may remain balanced. In addition, even when the robot 100 moves slowly or rapidly, the robot may remain balanced.

Even when the ground is inclined, since the balance of the robot 100 is kept using the joints of the two legs 110L and 110R supporting the torso 102, embodiments are applicable to a robot 100 including joints having 6 degrees of freedom.

In the walking robot and the method for controlling the posture thereof, by actively coping with external variation including using the COG of the robot and the rotation angle of the hip joint portion, it is possible to maintain a stable angle of the upper body while keeping an erect posture and balance.

Even in a state in which terrain information is not known in advance, the robot may keep an erect posture in a direction of gravity. Even when a plane where the robot stands is gradually inclined, the postures of the upper body and the legs of the robot may be kept while actively changing the angle of the ankle joint.

When the postures of the upper body and the legs are kept, the COG of the robot may be set to the middle portion between the feet. If the COG of the robot is set to one foot, one foot of the robot touches the ground. Using a similar method, the heel or toe of one foot touches the ground. This change is made in real time.

If a desired height (Z component) of the COG of the robot is reduced, the joint torque of the hip, the knee and the ankle is changed. As a result, the joint angle may be changed such that the upper body is lowered to the desired height.

If all the desired rotation angles (roll, pitch, yaw) of the pelvis link are set to 0, the robot is in an erect posture and, otherwise, the waist of the robot is bent in a certain direction. In particular, if a yaw value is changed, the pelvis may be twisted from a vertical axis. This change is made in real time.

If external force is applied, the robot withstands the external force with stiffness corresponding to a defined spring constant. If external force is continuously applied, the heel or toe of the foot is raised from the ground. Even in this case, balance may be kept. As a result, the robot does not fall over even when increased external force is applied to the robot.

The embodiments can be implemented in computing hardware and/or software, such as (in a non-limiting example) any computer that can store, retrieve, process and/or output data and/or communicate with other computers. For example, posture control unit 320 in FIG. 3 can include a computer to compute various calculations and/or perform various operations described herein. For example, COG computation unit 321, COG error computation unit 322, compensation force computation unit 323, leg distribution unit 324, rotation angle error computation unit 325, compensation moment computation unit 326, first torque computation unit 327, second torque computation unit 328 and/or torque compensation unit 329 in FIG. 3 may include, or have calculations and/or operations performed by, a computer. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Therefore, according to an embodiment, (a) a position of a current Center of Gravity (COG) of a robot having legs is calculated by a computer, (b) a position of a desired COG of the robot is set, (c) an error between the set position of the desired COG and the computed position of the current COG is computed by a computer, (d) force to be compensated for keeping balance of the robot using the computed error is computed by a computer, (e) the computed force is distributed by a computer to the legs, (f) joint torque is computed by a computer in accordance with the computed force, and (g) joints in the robot of controlled by a computer using the computed joint torque, to thereby control posture of the robot.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for controlling a posture of a robot including an upper body, a pelvis link connected to a lower side of the upper body, a plurality of hip joint portions connected to a lower side of the pelvis link, a plurality of legs respectively connected to the plurality of hip joint portions, and a plurality of feet respectively provided for the plurality of legs, the method comprising:
   computing, by a computer, a position of a current Center of Gravity (COG) of the robot;
   setting a position of a desired COG of the robot;
   computing, by a computer, an error between the set position of the desired COG and the computed position of the current COG;
   computing, by a computer, a force to be compensated for keeping balance of the robot using the computed error;
   distributing the computed force to the plurality of legs;
   computing, by a computer, joint torque of each of the legs in accordance with the distributed, computed force; and
   performing torque servo control using the computed joint torque,
   wherein the distributing of the computed force includes:
   computing distances between a point of the current COG of the robot projected on the ground and the plurality of feet; and
   enabling a leg closer to the point of the current COG of the robot projected on the ground to have a larger value, based on the computed distances.

2. The method according to claim 1, wherein the position of the desired COG is set to a position separated from a middle portion between the plurality of feet which touch the ground in a vertical direction.

3. The method according to claim 1, wherein the position of the desired COG is set to a position separated from a certain point of the plurality of feet which touch the ground in a vertical direction.

4. The method according to claim 1, wherein the force represents a virtual spring between the computed position of the current COG and the set position of the desired COG.

5. The method according to claim 1, further comprising:
   measuring an actual rotation angle of the pelvis link;
   computing an error between the measured actual rotation angle and a desired rotation angle; and
   computing moment to be compensated to keep the robot balanced using the computed error between the measured actual rotation angle and the desired rotation angle,
   wherein the computing of the joint torque includes computing the joint torque to generate the computed moment and the computed force.

6. The method according to claim 5, wherein the measuring of the actual rotation angle of the pelvis link includes measuring the rotation angle in a yaw direction (Z-axis rotation), a pitch direction (Y-axis rotation) and a roll direction (X-axis direction) with respect to inclination of a torso using an inertial measurement unit (IMU).

7. The method according to claim 5, further comprising computing gravity compensation torque of each of the legs,
   wherein the computing of the joint torque includes compensating for the joint torque of each of the legs using the computed gravity compensation torque.

8. The method according to claim 7, further comprising computing damping torque of each of the legs,
   wherein the computing of the joint torque compensates for the computed joint torque of each of the legs using the computed damping torque.

9. The method according to claim 7, wherein the gravity compensation torque is computed using angles q of all joints of the feet, masses and COG positions of all links belonging to the legs and the total mass and the current COG position of the upper body.

10. The method according to claim 7, wherein the computing of the gravity compensation torque of each of the legs includes performing gravity compensation in consideration of the weight of the upper body according to the distributed force.

11. The method according to claim 7, wherein the computing of the gravity compensation torque of each of the legs includes performing gravity compensation in consideration of the weight of another leg according to the states of the plurality of legs.

12. The method according to claim 11, wherein the states of the plurality of legs are divided into an upper body supporting state or a swing state depending on whether or not the feet respectively provided to the plurality of legs touch the ground.

13. A walking robot including an upper body, a pelvis link connected to a lower side of the upper body, a plurality of hip joint portions connected to a lower side of the pelvis link, a plurality of legs respectively connected to the plurality of hip joint portions, and a plurality of feet respectively provided for the plurality of legs, the walking robot comprising:
   a computation unit to calculate a position of a current Center of Gravity (COG) of the robot;
   a setting unit to set a position of a desired COG of the robot;
   a posture control unit to compute an error between the set position of the desired COG and the computed position of the current COG, to compute a force to be compensated to keep the robot balanced using the computed error, to distribute the computed force to the plurality of legs, and to compute joint torque of each of the legs in accordance with the distributed, computed force; and a servo control unit to perform torque servo control using the computed joint torque, wherein the posture control unit computes distances between a point of the current COG of the robot projected on the ground and the plurality of feet, and distributes the computed force to the plurality of legs so as to enable a leg closer to the point of the current COG of the robot projected on the ground to have a larger value based on the computed distances.

14. The walking robot according to claim 13, further comprising an inertial measurement unit (IMU) to measure an actual rotation angle of the pelvis link, wherein the posture control unit computes an error between the measured actual rotation angle and a desired rotation angle and computes moment to be compensated to keep the robot balanced using the computed error between the measured actual rotation angle and the desired rotation angle.

15. The walking robot according to claim 14, wherein the posture control unit computes gravity compensation torque of each of the legs and compensates for the joint torque of each of the legs using the computed gravity compensation torque.

16. The walking robot according to claim 15, wherein the posture control unit computes damping torque of each of the legs and compensates for the joint torque of each of the legs using the computed damping torque.

17. The walking robot according to claim 14, wherein the posture control unit computes the joint torque to generate the computed moment and the computed force, and controls the posture of each of the plurality of legs in accordance with the computed joint torque.

18. The walking robot according to claim 14, wherein the posture control unit measures the rotation angle in a yaw direction (Z-axis rotation), a pitch direction (Y-axis rotation) and a roll direction (X-axis direction) with respect to inclination of a torso using an inertial measurement unit (IMU).

19. The walking robot according to claim 13, wherein the force represents a virtual spring between the computed position, of the current COG and the set position of the desired COG.

20. A method comprising:
computing, by a computer, a position of a current Center of Gravity (COG) of a robot having;
setting a position of a desired COG of the robot;
computing, by a computer, an error between the set position of the desired COG and the computed position of the current COG;
computing, by a computer, a force to be compensated for keeping balance of the robot using the computed error;
distributing, by a computer, the computed force to the legs;
computing, by a computer, joint torque in accordance with the distributed, computed force; and
controlling, by a computer, joints in the robot using the computed joint torque, to thereby control posture of the robot,
wherein the distributing of the computed force includes:
computing distances between a point of the current COG of the robot projected on the ground and the plurality of feet; and
enabling a leg closer to the point of the current COG of the robot projected on the ground to have a larger value, based on the computed distances.

21. The method according to claim 20, wherein the force represents a virtual spring between the computed position of the current COG and the set position of the desired COG.

* * * * *